Feb. 3, 1959  G. A. ROWLS  2,872,500
STORAGE BATTERY NON-OVERFILL DEVICE
Filed April 25, 1955

INVENTOR.
GARTH A. ROWLS
BY John T. Marvin
HIS ATTORNEY

United States Patent Office 2,872,500
Patented Feb. 3, 1959

2,872,500
STORAGE BATTERY NON-OVERFILL DEVICE

Garth A. Rowls, Muncie, Ind., assignor to General Motors Corporation, Detroit, Mich., a corporation of Delaware Application April 25, 1955, Serial No. 503,488

3 Claims. (Cl. 136—178)

This invention relates to cell cover assemblies and is particularly directed to non-overfill devices for use with storage batteries or other containers for electrolytes.

The principal object of the present invention is to include a non-overfill device in a storage battery which will permit the escape of venting gases whenever the surface of the electrolyte is beneath a predetermined level and when the cap for the cell is in position. This object is accomplished by including a device according to the present invention in the battery cell between the cell cover and the plates of a storage battery so that it will prevent the escape of the venting gases when the surface of the battery electrolyte is at a predetermined level. The device is constructed and arranged to be moved in one direction by the fluid within the storage battery into sealing engagement with those portions of the cover which surround the filling opening in the cover, when the fluid has reached a predetermined level and to be moved by the vent cap downwardly into the fluid so that the area above the fluid may be vented when the vent cap is in position on the battery.

In carrying out the above object, it is a further object of the present invention to provide a non-overfill device which is adapted to float on the surface of the fluid electrolyte contained within the storage battery and sealingly engage portions of the cover when the fluid electrolyte is at a predetermined level and thereby prevent the escape of the venting gases and prevent the battery from being further filled.

A still further object of the present invention is to provide a non-overfill device that is moved in one direction by the fluid contained within a storage battery and in the other direction by the vent cap which closes a filler opening in the battery cover.

Further objects and advantages of the present invention will be apparent from the following description, reference being had to the accompanying drawings wherein preferred embodiment of the present invention are clearly shown.

Figure 5:
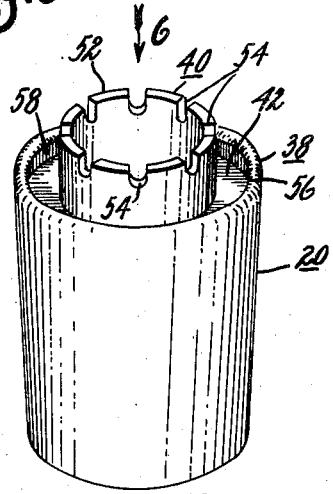
Figure 5 is an enlarged perspective view of the non-overfill device according to the present invention.

In practice, it has been found desirable to provide the batteries with some means for preventing overfilling of the cells with either water or an electrolyte so that the surface of the electrolyte is at the proper level to cover the plates but not completely fill the cell. It has been found that if the cell is overfilled with electrolyte and the electrolyte expands due to temperature changes, the expanded electrolyte will flow through the openings in the vent cap, spill over the top of the battery and corrode the battery hangers and other devices which are used to position and secure the battery. Thus, it has been found highly desirable to provide non-overfill devices in connection with storage batteries of the Faure type to prevent overfilling of the cells with electrolyte, particularly when water is added to the battery. In this connection, it is a simple matter to prevent overfilling of the battery when a unitary non-overfill device 20 as shown in Figure 5 is installed within the battery 24. This device 20 is constructed to respond or float on the fluid surface of the electrolyte 22 contained within the battery 24 and will rise into sealing engagement with a portion of the cover 26 when the fluid 22 has reached a predetermined level within the battery 24. The device 20 is also constructed to be forced downwardly into the battery cell when the vent cap 28 threadedly engages a portion of the cover 26. Thus, whenever the electrolyte or fluid 22 level is low, water may be poured through the device 20 until the device rises and sealingly engages the cover. When this sealing engagement occurs the escape of gases which occurs during the filling is substantially eliminated so as to make it impossible to further fill the battery.

Figure 4:
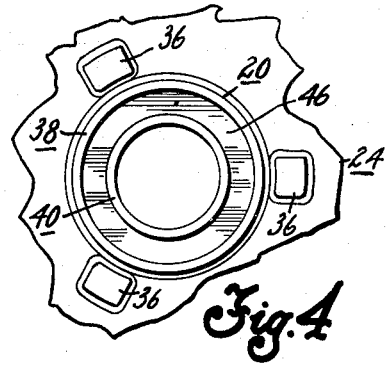
Figure 4 is a view taken in the direction of the arrows 4—4 in Figure 3.

The non-overfill device 20 of the present invention may be readily incorporated within the battery through the opening that is provided in the cell cover 26 when bushing 30 is removed. After the device 20 is in position within the battery, it is limited in its downward vertical movement by the battery plates 29 and its upward movement by the bushing 30 which now, in effect, becomes partly cover 26. The device is also limited in its lateral movement within the battery cell by suitable guide means 36 which are formed on and dependent from cover 26. The guide means 36 are herein shown as three circumferentially spaced columns 36 in Figure 4.

Figure 1:
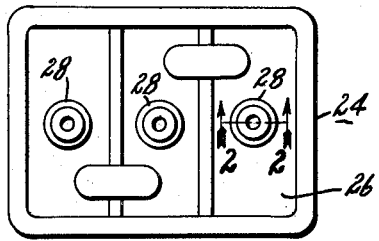
Figure 1 is a plan view of a storage battery incorporating a device according to the present invention.
Figure 2:
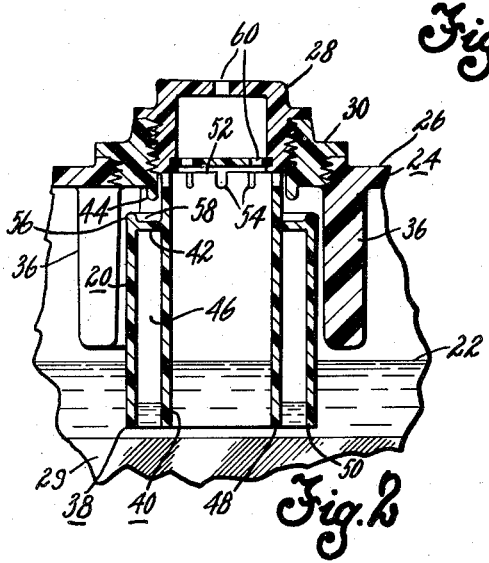
Figure 2 is a sectional view along lines 2—2 in Figure 1 showing a non-overfill device according to the present invention in a venting position.
Figure 3:
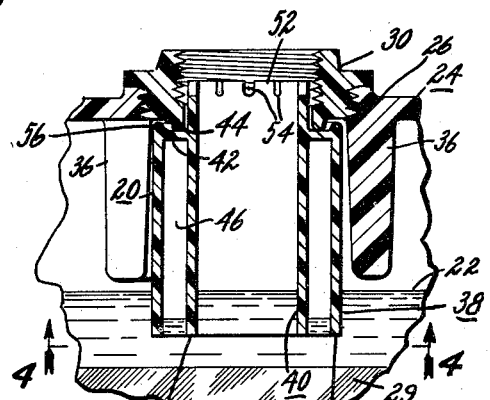
Figure 3 is a view along lines 2—2 in Figure 1 showing the battery cell cap removed and the non-overfill device according to the present invention in sealing engagement with the cell cover.
Figure 6:
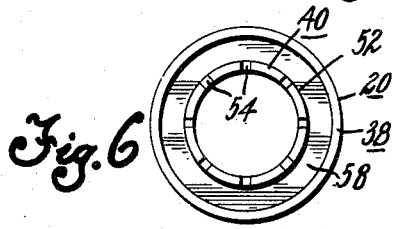
Figure 6 is a view taken in the direction of arrow 6—6 in Figure 5.

The device 20 is preferably formed of two cylindrical members 38 and 40 which are coaxially disposed in spaced relation relative to each other. The cylindrical members 38 and 40 are interconnected by an imperforate web 42 which is located so as to sealingly engage a rib portion 44 on the bushing 30. The web portion 42 and the cylindrical members 38 and 40 cooperate to provide a sealed gas chamber 46 when the lower ends 48 and 50 of members 38 and 40 respectively are immersed beneath the surface of the fluid 22. The member 20, because of the presence of chamber 46, will be caused to be buoyed upwardly as the level of the fluid 22 rises until the sealing engagement with portion 44 occurs. The inner cylindrical member 40 is formed to have a greater length than the outer cylindrical member 38 to have a portion 52 which extends beyond web 42. This portion 52 is provided with a plurality of vent notches 54 which permit the vent gases to pass and escape between the outer wall of portion 52 and the inner walls of bushing 30 when the cap 28 is applied to the cell cover. The web 42 has an upwardly extending flange portion 56 disposed to form an annular gutter 58. This gutter, after the battery has been in operation, will be filled with a fluid which is formed by droplets which are normally entrained in the vent gases. When the device 20 is in the position shown in Figure 3, this fluid will further increase the seal that occurs between the portion 44 of bushing 30 and the web 42.

From the above, it is apparent that when a device according to the present invention is installed in the cell of a storage battery, and it is desired to fill the battery with water, the vent cap 28 is first removed. The removal of the vent cap will cause the device to float on the fluid 22 level because of the buoyant action of the sealed gas chamber 46. When the level of the fluid is raised by the addition of water or electrolyte to the cell, the device 20 will move upwardly to be in engagement with the portions 44 of the cover. The engagement of the device 20 with the portions 44 will prevent a further escape of the gases which are dispelled by the entering fluid. When the cap is reapplied, the device 20 which is correctly maintained in position by guides 36 is moved downwardly, so as to break the seal between web 42 and portions 44 and permit the escape of venting gases to occur through the vent means 54 and the openings 60 which are provided in the battery cover.

While the embodiments of the present invention as herein disclosed, constitute preferred forms, it is to be understood that other forms might be adopted.

What is claimed is as follows:

1. A nonoverfill device for use in combination with a storage battery having a cell containing electrolyte and a cell cover including a threaded aperture therein that has a downwardly extending skirt means therearound, said nonoverfill device comprising; an annular plug having inner and outer threads wherein the outer threads are adapted to engage and screw into said threaded aperture, a seat at the lower end of said plug which is concentric with the cover skirt means when the plug is assembled with the cover, a float member adapted to float on said electrolyte and including an annular air chamber having concentric inner and outer walls and a top wall wherein the inner wall extends upwardly from the chamber and top wall and is freely slidably engaged in said annular plug, a valve on the top wall of the float which is engageable with the seat on the plug in the extreme upward position of the float relative to the plug, said float member having a maximum cross sectional radial dimension less than the maximum cross sectional radial dimension of said annular plug, and a vented cap adapted to thread into the inner threads of said plug to engage the float and to limit the upward movement of the float for preventing the valve from engaging the seat.

2. A non-overfill device for use in combination with a storage battery having a cover with an aperture therein, comprising; an apertured bushing adapted to be fixed in the aperture of the cover, said bushing having an annular seat on the lower end thereof, a float member slidingly mounted within the aperture of said bushing, said float member having an annular air chamber and a radial annular web that engages the annular seat of said bushing to provide an airtight seal, said float member having maximum cross sectional dimensions less than the maximum cross sectional dimensions of said bushing, fixed skirt means mounted concentrically with said annular air chamber, and a vented cap adapted to be fixed to said bushing and to engage the said float member to limit the upward movement of said member for preventing the member from engaging the said seat.

3. The combination with a storage battery having a cell containing an electrolyte and a cover having an aperture therein, comprising; a bushing within said cover aperture, a float member movable into vertical sealing relationship with said bushing, said float member being removable from the battery upon removal of said bushing, skirt means limiting lateral movement of said float member, and a cap removably secured to said bushing and adapted to bias the float member away from sealing engagement with said bushing.

References Cited in the file of this patent

UNITED STATES PATENTS

| | | |
|---|---|---|
| 812,451 | Rice | Feb. 13, 1906 |
| 1,717,573 | McAtee | June 18, 1929 |
| 2,240,461 | Riggs et al. | Apr. 29, 1941 |
| 2,271,129 | Paddock | Jan. 27, 1942 |
| 2,276,091 | Reppert | Mar. 10, 1942 |
| 2,298,789 | Hill et al. | Oct. 13, 1942 |
| 2,584,946 | Varengo | Feb. 5, 1952 |